United States Patent
Leleannec et al.

(10) Patent No.: US 10,462,492 B2
(45) Date of Patent: Oct. 29, 2019

(54) METHOD AND DEVICE FOR ENCODING A HDR PICTURE

(71) Applicant: INTERDIGITAL VC HOLDINGS, INC., Wilmington, DE (US)

(72) Inventors: Fabrice Leleannec, Mouazé (FR); Sebastien Lasserre, Thorigné Fouillard (FR); Franck Galpin, Thorigne-Fouillard (FR); Tangi Poirier, Rennnes (FR); Patrick Lopez, Livré sur Changeon (FR); Yannick Olivier, Thorigné Fouillard (FR); Edouard Francois, Bourg des Comptes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 245 days.

(21) Appl. No.: 15/353,045

(22) Filed: Nov. 16, 2016

(65) Prior Publication Data
US 2017/0142446 A1    May 18, 2017

Related U.S. Application Data

(60) Provisional application No. 15/353,045, filed on Nov. 16, 2016.

(30) Foreign Application Priority Data

Nov. 16, 2015   (EP) ..................................... 15306816
Feb. 1, 2016    (EP) ..................................... 16305102

(51) Int. Cl.
*H04N 19/70*      (2014.01)
*H04N 19/136*     (2014.01)
(Continued)

(52) U.S. Cl.
CPC ........... *H04N 19/70* (2014.11); *H04N 19/136* (2014.11); *H04N 19/196* (2014.11); *H04N 19/65* (2014.11); *H04N 19/98* (2014.11)

(58) Field of Classification Search
CPC .... H04N 19/136; H04N 19/196; H04N 19/65; H04N 19/98; H04N 19/70
(Continued)

(56) References Cited

U.S. PATENT DOCUMENTS

| 2013/0241931 A1* | 9/2013 | Mai | ........................ G06T 11/60 |
| --- | --- | --- | --- |
| | | | 345/428 |
| 2015/0201222 A1* | 7/2015 | Mertens | ................. H04N 19/46 |
| | | | 382/233 |

(Continued)

FOREIGN PATENT DOCUMENTS

EP    3051792    8/2016

OTHER PUBLICATIONS

Lasserre et al., "Technicolor's response to CfE for HDR and WCG (category 1)—Single layer HDR video coding with SDR backward compatibility", International Organisation for Standardisation Organisation Internationale de Normalisation ISO/IEC JTC1/SC29/WG11 Coding of Moving Pictures and Audio, ISO/IEC JTC1/SC29/WG11 MPEG2014/M36263r1, Warsaw, Poland, Jun. 2015, pp. 1-21.
(Continued)

*Primary Examiner* — William C Vaughn, Jr.
*Assistant Examiner* — Jae N Noh
(74) *Attorney, Agent, or Firm* — Lily Neff

(57) ABSTRACT

A method for coding an HDR picture is disclosed that includes mapping the HDR picture to obtain a SDR picture, determining color correcting parameters, color correcting said SDR picture responsive to said color correcting parameters, and encoding the color corrected SDR picture in a stream. In the method, determining color correcting param-
(Continued)

eters includes determining an intermediate SDR picture so that at least one color appearance value is preserved between said HDR picture and said intermediate SDR picture, and determining the color correcting parameters from said intermediate SDR picture and from said SDR picture.

9 Claims, 5 Drawing Sheets

(51) Int. Cl.
*H04N 19/65* (2014.01)
*H04N 19/196* (2014.01)
*H04N 19/98* (2014.01)

(58) Field of Classification Search
USPC .................................................. 375/240.08
See application file for complete search history.

(56) References Cited

U.S. PATENT DOCUMENTS

| 2017/0026646 | A1* | 1/2017 | Minoo | H04N 19/124 |
| 2017/0078706 | A1* | 3/2017 | Van Der Vleuten | H04N 5/20 |
| 2018/0232867 | A1* | 8/2018 | Park | G06T 5/00 |

OTHER PUBLICATIONS

Pouli et al., "Color Correction for Tone Reproduction", 21st Color and Image Conference, Nov. 2013, pp. 215-220.

Mantiuk et al., "Color correction for tone mapping", Eurographics 2009, vol. 28, No. 2, Apr. 2009, pp. 193-202.

Baylon et al., "Response to Call for Evidence for HDR and WCG Video Coding: Arris, Dolby and InterDigital", International Organisation for Standardisation Organisation Internationale de Normalisation ISO/IEC JTC1/SC29/WG11 Coding of Moving Pictures and Audio, ISO/IEC JTC1/SC29/WG11 MPEG2015/M36264, Warsaw, Poland, Jun. 2015, pp. 1-9.

Pascale, "A Review of RGB Color Spaces . . . from xyY to R'G'B'", The BabelColor Company, Montreal, Canada, Oct. 6, 2003, pp. 1-35.

Anonymous, "Parameter values for ultra-high definition television systems for production and international programme exchange", International Telecommunication Union Standard, ITU-R Radiocommunication Sector of ITU, Recommendation ITU-R BT.2020-1, BT Series Broadcasting service (television), Jun. 2014, pp. 1-8.

Anonymous, "Series H: Audiovisual and Multimedia Systems, Infrastructure of audiovisual services—Coding of moving video, High efficiency video coding", International Telecommunication Union Standard, ITU-T Telecommunication Standardization Sector of ITU, Recommendation ITU-T H.265, Oct. 2014, pp. 1-540.

Anonymous, "Candidate Test Model for HEVC extension for HDR and WCG video coding", International Organisation for Standardisation Organisation Internationale de Normalisation ISO/IEC JTC1/SC29/WG11 Coding of Moving Pictures and Audio, ISO/IEC JTC1/SC29/WG11 MPEG2015/M37xxx, Geneva, Switzerland, Oct. 2015, pp. 1-10.

Anonymous, "High Dynamic Range Electro-Optical Transfer Function of Mastering Reference Displays", FCD SMPTE Standard, SMPTE ST2084:201X, Version 1.24, Jun. 18, 2014, pp. 1-14.

Anonymous, "CIE 1931 color space", Wikipedia, https://en.wikipedia.org/wiki/CIE_1931_color_space, Sep. 10, 2016, pp. 1-10.

Anonymous, "Series H: Audiovisual and Multimedia Systems, Infrastructure of audiovisual services—Coding of moving video, Advanced video coding for generic audiovisual services", International Telecommunication Union Standard, ITU-T Telecommunication Standardization Sector of ITU, Recommendation ITU-T H.264, May 2003, pp. 1-282.

Anonymous, "Information technology—Generic coding of moving pictures and associated audio information: Video", International Standard ISO/IEC 13818-2, May 15, 1996, pp. 1-212.

* cited by examiner

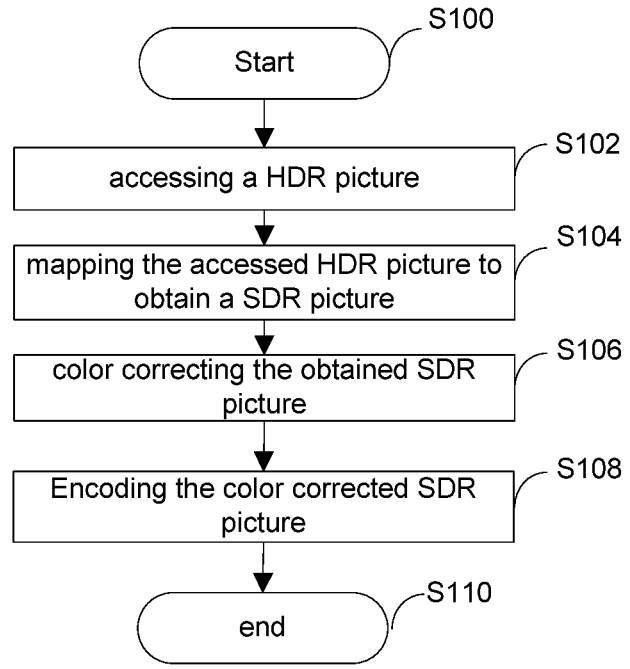
FIGURE 1 - State of the art
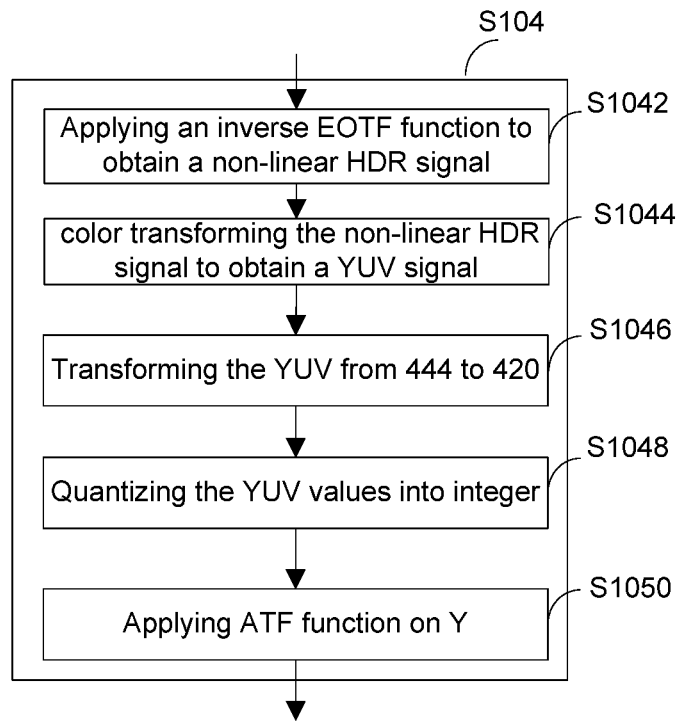
FIGURE 2 - State of the art

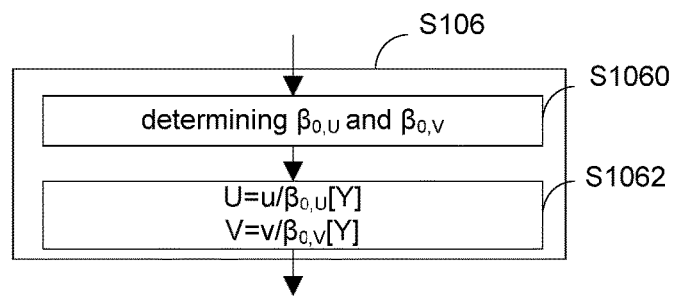
FIGURE 3 - State of the art
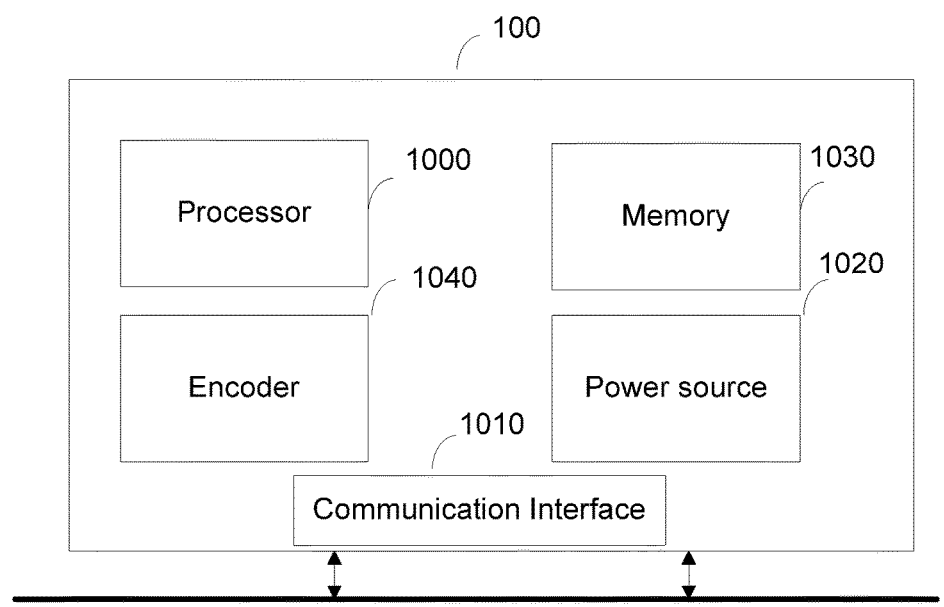
FIGURE 4

METHOD AND DEVICE FOR ENCODING A HDR PICTURE

1. REFERENCE TO RELATED EUROPEAN APPLICATIONS

This application claims priority from European Application No. 15306816.8, entitled "Method and Device for Encoding a HDR Picture," filed on Nov. 16, 2015, and European Application No. 16305102.2, entitled "Method and Device for Encoding a HDR Picture, filed on Feb. 1, 2016, the contents of which are hereby incorporated by reference in its entirety.

2. TECHNICAL FIELD

In the following, a method and a device for encoding a HDR picture are disclosed.

3. BACKGROUND ART

For distributing HDR (English acronym of "High Dynamic Range") video content, it is known to first map the HDR video content to obtain a video content of lower dynamic range, also referred to as a SDR (English acronym of "Standard Dynamic Range") video content. The document ISO/IEC JTC1/SC29/WG11 MPEG2015/M37285 entitled *Candidate Test Model for HEVC extension for HDR and WCG video coding* and published in October 2015 discloses a method for encoding HDR and also Wide Gamut video contents. FIG. 1 depicts a simplified flowchart of the method for encoding a HDR picture as disclosed in the document M37285. The method begins at step S100. At step S102, a HDR picture is accessed. At step S104, the accessed HDR picture is mapped to obtain a SDR picture representation of the HDR picture, i.e. its dynamic range is reduced. In step S106, the obtained SDR picture is color corrected. The color correction, based on a luma-dependent chroma scaling, aims at controlling the color shift due to the previous mapping step. It modifies each chroma sample. In step S108, the color corrected SDR picture is encoded for example using a HEVC encoder.

FIG. 2 depicts a flowchart of a method for mapping the HDR picture to obtain a SDR picture as disclosed in the document M37285. This method may be used in the step S104 of the method depicts on FIG. 1.

In step S1042, an inverse EOTF function (EOTF stands for "Electro-Optical Transfer Function") is applied on the HDR picture to obtain a non-linear HDR signal. In step S1044, the non-linear HDR signal is color transformed, if represented with RGB color values, to obtain a YUV signal (i.e. a signal in a YCbCr color space). In step S1046, the YUV signal is transformed from 444 to 420 format, i.e. the chroma is downsampled. In step S1048, the 420 YUV values are quantized into integer values. In step S1050, an ATF function (ATF stands for "Adaptive Transfer Functionality") is applied on Y. ATF functionality aims at adjusting dynamic range in the YCbCr domain.

FIG. 3 depicts a flowchart of a method for color correcting the SDR picture. This method may be used in step S106 of the method depicts on FIG. 1. In a step S1060, two mono-dimensional functions $\beta_{0,U}$ and $\beta_{0,V}$ are obtained or determined. As an example, $\beta_{0,U}$ and $\beta_{0,V}$ are represented using Look-Up Tables (LUTs). These functions/parameters make it possible to control the color saturation of the SDR signal. Possibly, only one function is used for the two chroma components. In the document M37285, the functions $\beta_{0,U}$ and $\beta_{0,V}$ are referred to as $\beta_{Cb}$ and $\beta_{Cr}$ respectively. In step S1062, the chroma samples U and V of the SDR picture are modified according to the following equations: $U=u/\beta_{0,U}[Y]$ and $V=v/\beta_{0,V}[Y]$. Color correction divides each Chroma component Cb and Cr, noted U and V here, respectively by a factor $\beta_{0,U}[Y_{coloc}]$ and $\beta_{0,V}[Y_{coloc}]$ which depend on the luma signal. More precisely, the luma signal considered here is the luma component value at a spatial position that is co-located with the considered Chroma sample. It is noted $Y_{coloc}$ in the following. In the case of a 420 signal, the luma component may be averaged on 4 samples to find the spatial position that is co-located with the considered Chroma sample. The functions $\beta_{0,U}(\ )$ and $\beta_{0,V}(\ )$ may be modeled using 2 look-up-tables of dimension ($2^{BitDepthY}-1$) (BitDepthY being the bit-depth of the luma samples). They can be obtained using manual tuning, to enable artistic control of the SDR rendering.

There is thus a need to determine the $\beta_{0,U}(\ )$ and $\beta_{0,V}(\ )$ so that the SDR picture is perceptually of good quality.

4. BRIEF SUMMARY

A method for coding an HDR picture is disclosed that comprises:
   mapping the HDR picture to obtain a SDR picture;
   determining color correcting parameters;
   color correcting the SDR picture responsive to the color correcting parameters; and
   encoding the color corrected SDR picture in a stream.

In a specific embodiment, determining color correcting parameters comprises:
   determining an intermediate SDR picture so that at least one color appearance value is preserved between the HDR picture and the intermediate SDR picture;
   determining the color correcting parameters from the intermediate SDR picture and from the SDR picture.

A coding device for coding a HDR picture is disclosed that comprises:
   means for mapping the HDR picture to obtain a SDR picture;
   means for determining color correcting parameters;
   means for color correcting the SDR picture responsive to the color correcting parameters; and
   means for encoding the color corrected SDR picture in a stream.

In a specific embodiment, the means for determining color correcting parameters comprises:
   means for determining an intermediate SDR picture so that at least one color appearance value is preserved between the HDR picture and the intermediate SDR picture; and
   means for determining the color correcting parameters from the intermediate SDR picture and from the SDR picture.

A coding device comprising a communication interface to access a HDR picture is disclosed. The coding device further comprises at least one processor configured to:
   map the accessed HDR picture to obtain a SDR picture;
   determine color correcting parameters;
   color correct the SDR picture responsive to the color correcting parameters; and
   encode the color corrected SDR picture in a stream.

According to a specific embodiment, to determine color correcting parameters comprises:
   to determine an intermediate SDR picture so that the hue is preserved between the HDR picture and the intermediate SDR picture;

to determine the color correcting parameters from the intermediate SDR picture and from the SDR picture.

A non-transitory computer readable medium with instructions stored therein is disclosed. The instructions, upon execution, instruct at least one processor to:
- map the accessed HDR picture to obtain a SDR picture;
- determine color correcting parameters;
- color correct the SDR picture responsive to the color correcting parameters; and
- encode the color corrected SDR picture in a stream.

In a specific embodiment, to determine color correcting parameters comprises:
- determining an intermediate SDR picture so that the hue is preserved between the HDR picture and the intermediate SDR picture;
- determining the color correcting parameters from the intermediate SDR picture and from the SDR picture.

The following embodiments and variants applies to all method, device, non-transitory computer readable medium, etc.

According to a specific characteristic, the color appearance value is a hue or a saturation.

In another specific embodiment, determining an intermediate SDR picture so that a color appearance value is preserved comprises for a current pixel:
- linearizing a SDR luma value of the current pixel in the obtained SDR picture;
- obtaining a corresponding linearized HDR luminance value from the HDR picture;
- determining a ratio linking the linearized SDR and HDR luminance values;
- determining linear SDR RGB values from the accessed HDR picture and the ratio; and
- determining non-linear chroma values from the determined linear SDR RGB values, the luma value of the intermediate SDR picture for the current pixel being equal to the luma value of the obtained SDR picture.

In yet another non-limiting embodiment, determining the color correcting parameters from the intermediate SDR picture and from the SDR picture comprises minimizing a distance between chroma components of the SDR picture color corrected and corresponding chroma components of the intermediate SDR picture inside a considered luma sub-range.

In a specific embodiment, color correcting the SDR picture responsive to the color correcting parameters comprises dividing each color component of the SDR picture by a color correcting parameter.

5. BRIEF SUMMARY OF THE DRAWINGS

FIG. 1 depicts a simplified flowchart of the method for encoding a HDR picture according to the prior art;

FIG. 2 depicts a flowchart of a method for mapping the HDR picture to obtain a SDR picture according to the prior art;

FIG. 3 depicts a flowchart of a method for color correcting a SDR picture according to the prior art;

FIG. 4 represents an exemplary architecture of a transmitter configured to encode a HDR picture in a stream according to a non-limiting embodiment;

6. DETAILED DESCRIPTION

Figure 5:
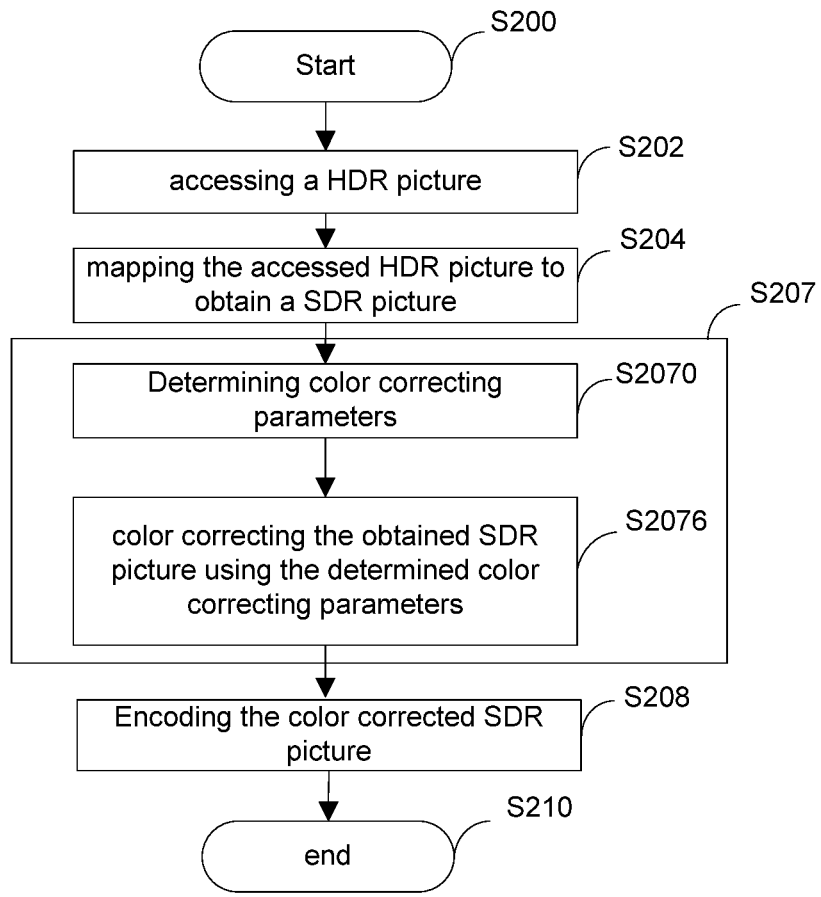
FIG. 5 represents a flowchart of a method for encoding a HDR picture in a stream according to a specific and non-limitative embodiment.

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various color components, these color components should not be limited by these terms. These terms are only used to distinguish one color component from another. For example, a first color component could be termed "a component" or "a second color component", and, similarly, a second color component could be termed "another component" or "a first color component" without departing from the teachings of the disclosure.

FIG. 4 represents an exemplary architecture of a transmitter 100 configured to encode a HDR picture in a stream according to a non-limiting embodiment.

The transmitter 100 comprises one or more processor(s) 1000, which may comprise, for example, a CPU, a GPU and/or a DSP (English acronym of Digital Signal Processor), along with internal memory 1030 (e.g. RAM, ROM, and/or EPROM). The transmitter 100 comprises one or more communication interface(s) 1010, each adapted to display output information and/or allow a user to enter commands and/or data (e.g. a keyboard, a mouse, a touchpad, a webcam); and a power source 1020 which may be external to the transmitter 100. The transmitter 100 may also comprise one or more network interface(s) (not shown). Encoder module 1040 represents the module that may be included in a device to perform the coding functions. Additionally, encoder module 1040 may be implemented as a separate element of the transmitter 100 or may be incorporated within processor(s) 1000 as a combination of hardware and software as known to those skilled in the art.

The HDR picture or at least one block of the HDR picture may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the stream may be sent to a destination. As an example, the stream is stored in a remote or in a local memory, e.g. a video memory or a RAM, a hard disk. In a variant, the stream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 100 further comprises a computer program stored in the memory 1030. The computer program comprises instructions which, when executed by the transmitter 100, in particular by the processor 1000, enable the transmitter 100 to execute the method described with reference to any FIGS. 5 to 8. According to a variant, the computer program is stored externally to the transmitter 100 on a non-transitory digital data support, e.g. on an external storage medium such as a HDD, CD-ROM, DVD, a read-only and/or DVD drive and/or a DVD Read/Write drive, all known in the art. The transmitter 100 thus comprises a mechanism to read the computer program. Further, the transmitter 100 could access one or more Universal Serial Bus (USB)-type storage devices (e.g., "memory sticks.") through corresponding USB ports (not shown).

According to exemplary and non-limiting embodiments, the transmitter 100 can be, but is not limited to:
- a mobile device;
- a communication device;
- a game device;
- a tablet (or tablet computer);
- a laptop;
- a still image camera;
- a video camera;
- an encoding chip or encoding device;
- a still image server; and
- a video server (e.g. a broadcast server, a video-on-demand server or a web server).

FIG. 5 represents a flowchart of a method for encoding a HDR picture in a stream according to a specific and non-limitative embodiment. On FIG. 5, the modules are functional units, which may or may not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively "Application Specific Integrated Circuit", "Field-Programmable Gate Array", "Very Large Scale Integration", or from several integrated electronic components embedded in a device or from a blend of hardware and software components.

The method begins at step S200. At step S202, the transmitter 100 access a HDR picture, e.g. a HDR picture of RGB components. At step S204, the transmitter maps the accessed HDR picture to obtain a SDR picture, e.g. a YUV or YCbCr SDR picture. As an example, a simple inverse EOTF function, e.g. the known PQ EOTF, may be applied followed by a color space conversion to generate a YCbCr picture. In yet another variant, the steps S1042 to S1050 disclosed with reference to FIG. 2 may be used to map the RGB HDR picture to obtain a YUV SDR picture.

It will be appreciated, however, that the present principles are not restricted to these specific methods for mapping a HDR picture in order to obtain a SDR picture. Indeed, any method making it possible to reduce the dynamic range of a HDR picture is suitable. In step S207, the obtained SDR picture is color corrected. More precisely, its color components, e.g. its chroma samples such as UV or CbCr, are modified so that the perceptual quality of the color corrected SDR picture is increased. The step S207 comprises a first step S2070 and a second step S2076.

Figure 6:
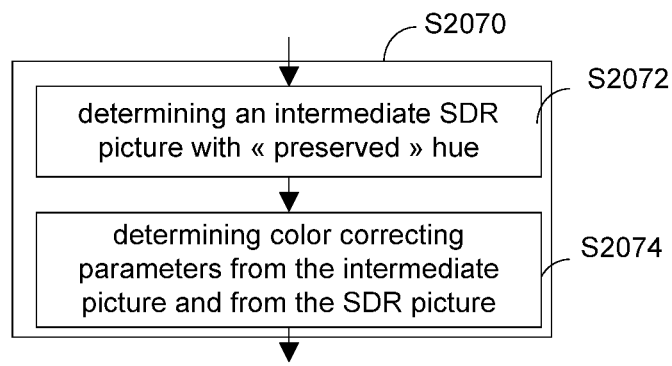
FIG. 6 represents details of FIG. 5.
Figure 7:
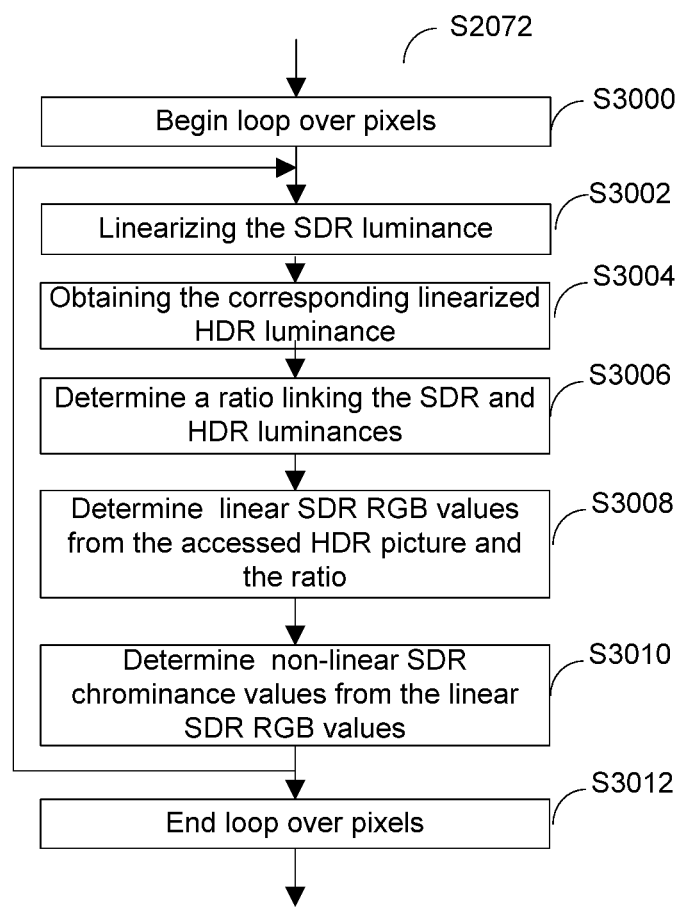
FIG. 7 represents details of FIG. 5.

In the step S2070, the transmitter determines color correcting parameters $\beta_{0,U}(\ )$ and $\beta_{0,V}(\ )$. FIG. 6 details the step S2070. It comprises a step S2072 and a step S2074. In the step S2072, the transmitter determines an intermediate SDR picture with preserved color appearance, e.g. the hue, with respect to the accessed HDR picture. To this aim, it is sufficient to ensure that the proportion between RGB values is kept unchanged between the accessed HDR picture and the intermediate SDR picture in the linear RGB color space. In this intermediate SDR picture the luma is not modified, i.e. the luma of the intermediate SDR picture is set equal to the luma of the SDR picture obtained at step S204. The step S2072 is detailed on FIG. 7. In a step S3000, a loop over the pixels of the obtained SDR picture begins. In a step S3002, the SDR luma value Y of a current pixel is linearized. The linearized value is denoted LSDR. A luminance value is said to be linear when it is proportional to the quantity of light received by a captor. A non-linear value is usually obtained after application of a correction curve, e.g. PQ EOTF, gamma correction, etc. In the literature, the words luma and chroma are used in a non-linear domain while the words luminance and chrominance are used in the linear domain. For instance, an inverse gamma correction of specification ITU-R BT2020 may be used. An approximation of this inverse gamma correction may be employed as follows:

$$L_{SDR} = \left(\frac{Y}{2^{BitDepthY}-1}\right)^{1/0.45}$$

In step S3004, a corresponding HDR linearized luminance value $L_{HDR}$ is obtained. The linearized luminance value $L_{HDR}$ is either obtained directly from a memory or is determined from corresponding RGB values according to the following equation:

$$L_{HDR} = M_{1 \times 3} \begin{pmatrix} R_{HDR} \\ G_{HDR} \\ B_{HDR} \end{pmatrix}$$

The matrix $M_{1 \times 3}$ is for example provided by specification ITU-R BT2020 for a RGB2020 to YCbCr ad-hoc 3×3 color space conversion.

In step S3006, a ratio w linking the SDR and HDR linearized luminance values for the current pixel is determined as follows: $w = L_{SDR}/L_{HDR}$.

In step S3008, the linear SDR RGB values denoted $$\begin{pmatrix} R_{SDR} \\ G_{SDR} \\ B_{SDR} \end{pmatrix}$$

for the current pixel are determined from the accessed HDR picture and the ratio w as follows:

$$\begin{pmatrix} R_{SDR} \\ G_{SDR} \\ B_{SDR} \end{pmatrix} = w \cdot \begin{pmatrix} R_{HDR} \\ G_{HDR} \\ B_{HDR} \end{pmatrix}$$

where $$\begin{pmatrix} R_{HDR} \\ G_{HDR} \\ B_{HDR} \end{pmatrix}$$

are the linear RGB values for the co-located pixel in the accessed HDR picture. Finally, in step S3010, the non-linear SDR chroma values (UV or CbCr) are determined from the linear SDR RGB values. The operation consists in SDR gamma correction (approximated by a power of 0.45 here) followed by the RGB to YCbCr color space conversion 3×3 matrix. Since Y is not modified, the first line of the 3×3 matrix is discarded.

$$\begin{pmatrix} U_{int} \\ V_{int} \end{pmatrix} = M_{2 \times 3} \cdot \begin{pmatrix} R_{SDR}^{0.45} \\ G_{SDR}^{0.45} \\ B_{SDR}^{0.45} \end{pmatrix}$$

The current pixel in the intermediate picture has thus the following values: (Y $U_{int}$ $V_{int}$). The steps S3002 to S3010 are iterated until all pixels of a picture region, of a whole picture or of a group of pictures are processed. Indeed, the method may apply on successive pictures of a video, or on only a portion of a picture.

At step S3012, the method ends the loop over the pixels.

Figure 8:
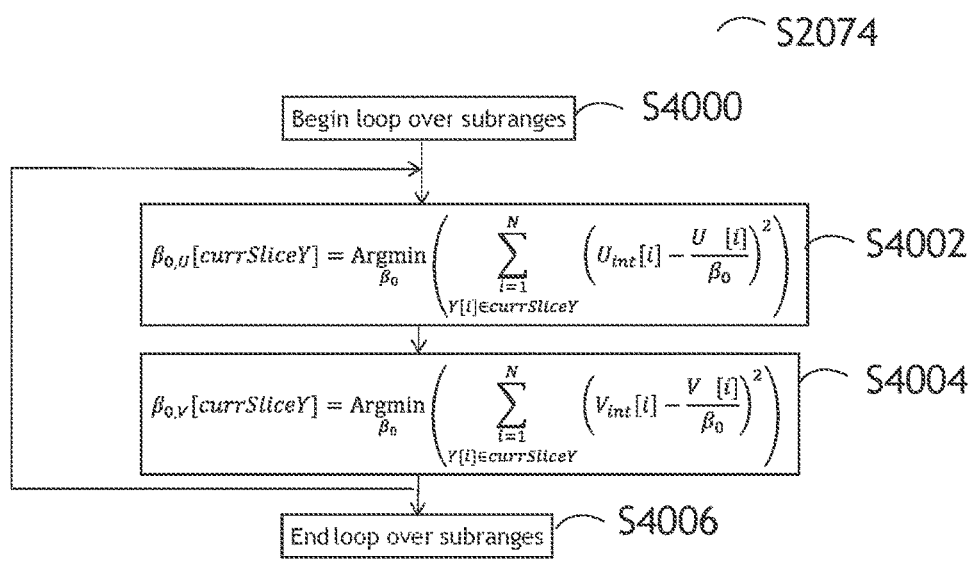
FIG. 8 represents details of FIG. 5.

In the step S2074, the transmitters determines the color correcting functions/parameters from the intermediate picture (Y, $U_{int}$, $V_{int}$) and from the SDR picture (Y,U,V) obtained at step S204, or from regions of such pictures or from successive intermediate pictures and their corresponding SDR pictures. FIG. 8 details the step S2074.

To this aim, the luma range is divided in a plurality of subranges. In a step S4000, a loop over the subranges begins. In step S4002, the first parameter/function $\beta_{0,U}[\ ]$ is determined for the current subrange denoted currSliceY as follows:

$$\beta_{0,U}[currSliceY] = \underset{\beta_0}{\operatorname{Argmin}} \left( \sum_{\substack{i=1 \\ Y[i] \in currSliceY}}^{N} \left(U_{int}[i] - \frac{U[i]}{\beta_0}\right)^2 \right)$$

In a step S4004, the second parameters/function $\beta_{0,V}[\ ]$ is determined for the current subrange denoted currSliceY as follows:

$$\beta_{0,V}[currSliceY] = \underset{\beta_0}{\operatorname{Argmin}} \left( \sum_{\substack{i=1 \\ Y[i] \in currSliceY}}^{N} \left(V_{int}[i] - \frac{V[i]}{\beta_0}\right)^2 \right)$$

$\beta_{0,U}[\bullet]$ is for example determined through a least mean square procedure, which aims at minimizing the L2 distance between the color corrected chroma component $U/\beta_{0,U}$ [currSlice] and the intermediate $U_{int}$ component values inside the considered Y sub-range. The optimal $\beta_{0,U}$ [currSlice] value is given by:

$$\beta_{0,U}[currSlice] = \left( \frac{U_{int} \cdot (U)^t}{\|U\|^2} \right)^{-1}$$

$$= \left( \frac{\sum_{\substack{i=1 \\ Y[i] \in currSliceY}}^{N} (U_{int}[i] \cdot U[i])}{\sum_{\substack{i=1 \\ Y[i] \in currSliceY}}^{N} (U[i])^2} \right)^{-1}$$

$\beta_{0,V}[\bullet]$ is computed the same way as $\beta_{0,U}[\bullet] \cdot \beta_{0,V}[\bullet]$ and $\beta_{0,U}[\bullet]$ may be represented by Look-Up Tables. The steps S4002 and S4004 are iterated until all subranges are processed.

The loop over subranges ends at step S4006.

In a variant, the transmitter determines the color correcting parameters from several successive intermediate pictures, for example for a GOP (English acronym of "Group Of Pictures") or from only picture portions.

Note that with the method of FIG. 8, the $\beta_{0,U}[\bullet]$ and $\beta_{0,V}[\bullet]$ Look-Up Tables are determined for a limited set of luma values (i.e. the plurality of subranges), corresponding to the Y sub-ranges. A further interpolation step may thus take place after the step S2074. The Look-Up Tables $\beta_{0,U}[\bullet]$ and $\beta_{0,V}[\bullet]$ may be filled for each value of Y using for example a simple linear interpolation method.

In the step S2076, the transmitters color corrects the obtained SDR picture using the determined color correcting parameters. More precisely, the chroma components of the SDR picture obtained at step S204 are modified as follows:

$U=u/\beta_{0,U}[Y]$ and $V=v/\beta_{0,V}[Y]$. Color correcting thus comprises dividing each chroma component Cb and Cr, noted U and V here, respectively by a factor $\beta_{0,U}[Y_{coloc}]$ and $\beta_{0,V}[Y_{coloc}]$ which depend on the luma signal at the same spatial position, where $\beta_{0,U}[Y_{coloc}]$ and $\beta_{0,V}[Y_{coloc}]$ are the function or LUTs determined at step S2074. The encoding method is backward compatible, i.e. the SDR after color correction may be viewed with a good level of consistency with the accessed HDR picture. Further the hue is at least partially preserved between the accessed HDR picture and the color corrected SDR picture.

In a step S208, the color corrected SDR picture is encoded. The color correcting parameters/functions are also encoded for example in SEI message (SEI stands for "Supplemental Enhancement Information"), in a Picture Parameter Set, or any type of aside metadata. The encoding is for example compliant with the HEVC video coding standard as disclosed in the document from ITU-T entitled "H.265 *series H: Audiovisual and Multimedia systems Infrastructure of audiovisual services—Coding of moving video*", MPEG-2, or H.264, etc. It will be appreciated, however, that the present principles are not restricted to these specific methods for encoding a picture. Indeed, any method making it possible to encode a picture is suitable. Encoding a picture usually comprises dividing the picture into picture blocks. The encoding method applies on each block. For a current block, the encoding method usually comprises determining a prediction, determining a residual block by subtracting the prediction block from the current block. The residual block is then transformed into frequency coefficients, e.g. by a Discrete Cosine Transform. The frequency coefficients are then quantized and the quantized coefficients are entropy coded. These steps are found in typical encoding and/or decoding methods.

The method disclosed with the preservation of the hue may be generalized to the preservation of any appearance value. In another embodiment, the saturation may be preserved instead of the hue or in addition to the hue.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

What is claimed is:

1. A method for coding a HDR picture comprising:
    mapping the HDR picture to obtain a SDR picture;
    determining color correcting parameters;
    color correcting said SDR picture responsive to said color correcting parameters;
    encoding the color corrected SDR picture and the color correcting parameters in a backward compatible stream, so that a corresponding HDR picture can be generated from the SDR picture and the color correcting parameters; wherein the method operates in a YCbCr color space; and
    wherein determining color correcting parameters comprises:
        determining color correcting parameters comprises:
        determining an intermediate reference SDR picture so that luminance of the intermediate picture is equal to luminance values of the obtained SDR picture and hue is preserved between said HDR picture and said intermediate reference SDR picture;
        determining the color correcting parameters for Cb and Cr components from said intermediate reference SDR picture and from said obtained SDR picture.

2. The method of claim 1, wherein determining an intermediate SDR picture so that the hue is preserved comprises for a current pixel:
    linearizing a SDR luminance value of said current pixel in the obtained SDR picture;
    obtaining a corresponding linearized HDR luminance value from said HDR picture;
    determining a ratio linking the linearized SDR and HDR luminance values;
    determining linear SDR RGB values from the accessed HDR picture and the ratio; and
    determining non-linear chroma values from the determined linear SDR RGB values, the luminance value of the intermediate SDR picture for the current pixel being set equal to the luminance value of the obtained SDR picture.

3. The method according to claim 1, wherein determining the color correcting parameters from said intermediate reference SDR picture and from said SDR picture comprises, inside a considered luma sub-range, determining a lookup table for Cb chroma components by minimizing a L2 distance between Cb chroma components of said SDR picture color corrected and corresponding Cb chroma components of said intermediate reference SDR picture and determining a lookup table for Cr chroma components by minimizing a L2 distance between Cr chroma components of said SDR picture color corrected and corresponding Cr chroma components of said intermediate reference SDR picture.

4. The method according claim 1, wherein color correcting said SDR picture responsive to said color correcting parameters comprises dividing each color component of said SDR picture by a color correcting parameter.

5. A coding device comprising a communication interface to access a HDR picture and at least one processor configured to:
    map the accessed HDR picture to obtain a SDR picture;
    determine color correcting parameters;
    color correct said SDR picture responsive to said color correcting parameters;
    encode the color corrected SDR picture and the color correcting parameters in a backward compatible stream, so that a corresponding HDR picture can be generated from the SDR picture and the color correcting parameters;
wherein the operations are performed in a YCbCr color space and wherein to determine color correcting parameters comprises:
    to determine an intermediate reference SDR picture so that luminance of the intermediate picture is equal to luminance values of the obtained SDR picture and hue is preserved between said HDR picture and said intermediate reference SDR picture;
    to determine the color correcting parameters for Cb and Cr components from said intermediate reference SDR picture and from said obtained SDR picture.

6. The coding device of claim 5, wherein to determine an intermediate SDR picture so that the color appearance value is preserved comprises for a current pixel:
    linearizing a SDR luminance value of said current pixel in the obtained SDR picture;
    obtaining a corresponding linearized HDR luminance value from said HDR picture;
    determining a ratio linking the linearized SDR and HDR luminance values;
    determining linear SDR RGB values from the accessed HDR picture and the ratio; and
    determining non-linear chroma values from the determined linear SDR RGB values, the luminance value of the intermediate SDR picture for the current pixel being set equal to the luminance value of the obtained SDR picture.

7. The device according to claim 5, wherein to determine the color correcting parameters from said intermediate reference SDR picture and from said SDR picture comprises, inside a considered luma sub-range, to determine a lookup table for Cb chroma components by minimizing a L2 distance between Cb chroma components of said SDR picture color corrected and corresponding Cb chroma components of said intermediate reference SDR picture and to determine a lookup table for Cr chroma components by minimizing a L2 distance between Cr chroma components of said SDR picture color corrected and corresponding Cr chroma components of said intermediate reference SDR picture.

8. The device according to claim 5, wherein color correcting said SDR picture responsive to said color correcting parameters comprises dividing each color component of said SDR picture by a color correcting parameter.

9. A non-transitory computer readable medium with instructions stored therein which, upon execution, instruct at least one processor to:
    map the accessed HDR picture to obtain an SDR picture;
    determine color correcting parameters;
    color correct said SDR picture responsive to said color correcting parameters;
    encode the color corrected SDR picture and the color correcting parameters in a backward compatible stream, so that a corresponding HDR picture can be generated from the SDR picture and the color correcting parameters;
wherein the operations are performed in a YCbCr color space and wherein to determine color correcting parameters comprises:
    to determine an intermediate reference SDR picture so that luminance of the intermediate picture is equal to luminance values of the obtained SDR picture and hue is preserved between said HDR picture and said intermediate reference SDR picture;
    to determine the color correcting parameters for Cb and Cr components from said intermediate reference SDR picture and from said obtained SDR picture.

* * * * *